US008619969B2

(12) United States Patent
Muralt et al.

(10) Patent No.: US 8,619,969 B2
(45) Date of Patent: Dec. 31, 2013

(54) ADAPTIVE INTEGRATED HYBRID WITH COMPLEX ADAPTATION FOR DIGITAL SUBSCRIBER LINE SYSTEMS

(75) Inventors: Arnold Muralt, Fair Haven, NJ (US); Eduard Sackinger, Tinton Falls, NJ (US); Fenghua Zheng, Marlboro, NJ (US); Fred Larsen, Tinton Falls, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 710 days.

(21) Appl. No.: 12/857,775

(22) Filed: Aug. 17, 2010

(65) Prior Publication Data

US 2011/0044415 A1    Feb. 24, 2011

Related U.S. Application Data

(60) Provisional application No. 61/235,268, filed on Aug. 19, 2009.

(51) Int. Cl.
*H04B 3/23* (2006.01)
*G06F 17/10* (2006.01)
*H04L 25/03* (2006.01)
*H04M 11/00* (2006.01)

(52) U.S. Cl.
USPC ... 379/406.01; 331/176; 370/286; 379/93.29; 379/392.01; 379/395; 379/402; 379/403; 708/322

(58) Field of Classification Search
USPC .......... 331/176; 370/286; 375/219, 327, 350, 375/355; 379/93.29, 392.01, 395, 402, 403, 379/406.01; 708/322
See application file for complete search history.

(56) References Cited

U.S. PATENT DOCUMENTS

| 5,163,044 | A | * | 11/1992 | Golden | 370/286 |
| 5,206,854 | A | * | 4/1993 | Betts et al. | 370/286 |
| 5,909,384 | A | * | 6/1999 | Tal et al. | 708/322 |
| 6,829,352 | B2 | * | 12/2004 | De Wilde | 379/395 |
| 6,996,200 | B2 | * | 2/2006 | Schubert et al. | 375/355 |
| 7,010,025 | B1 | * | 3/2006 | Helfenstein et al. | 375/219 |
| 7,031,446 | B2 | * | 4/2006 | Wilson et al. | 379/93.29 |
| 7,088,818 | B2 | * | 8/2006 | Prendergast et al. | 379/403 |
| 7,298,711 | B1 | * | 11/2007 | Jarcy | 370/286 |
| 7,457,258 | B2 | * | 11/2008 | Stetson et al. | 370/286 |
| 7,738,654 | B2 | * | 6/2010 | Pagnanelli | 379/402 |
| 8,243,855 | B2 | * | 8/2012 | Zarei | 375/327 |
| 2002/0041675 | A1 | * | 4/2002 | De Wilde | 379/392.01 |
| 2004/0095994 | A1 | | 5/2004 | Dowling | |
| 2004/0100340 | A1 | * | 5/2004 | Cui et al. | 331/176 |
| 2005/0141440 | A1 | | 6/2005 | Stetson et al. | |
| 2009/0109881 | A1 | | 4/2009 | Li et al. | |
| 2011/0044415 | A1 | * | 2/2011 | Muralt et al. | 375/350 |

OTHER PUBLICATIONS

International Search Report and Written Opinion, mailing date of Oct. 12, 2010.

* cited by examiner

*Primary Examiner* — Gerald Gauthier
(74) *Attorney, Agent, or Firm* — Pillsbury Winthrop Shaw Pittman LLP (57) ABSTRACT

An adaptive hybrid system is coupled to a loop for adjusting trans-hybrid loss. The system comprises a fixed portion comprising a first receiver transfer function block and a first hybrid transfer function block. The fixed portion is configured to receive a far-end signal and mitigate frequency dependent attenuation experienced by the far-end signal. The system also comprises a variable portion comprising a second receiver transfer function block and a second hybrid transfer function block configured to subtract a transmit echo from the received far-end signal.

20 Claims, 10 Drawing Sheets

ADAPTIVE INTEGRATED HYBRID WITH COMPLEX ADAPTATION FOR DIGITAL SUBSCRIBER LINE SYSTEMS

CROSS-REFERENCE TO RELATED APPLICATION

This application claims priority to, and the benefit of, U.S. Provisional Patent Application entitled, "Adaptive Integrated Hybrid with Complex Adaptation for DSL Optimized for VDSL," having Ser. No. 61/235,268, filed on Aug. 19, 2009, which is incorporated by reference in its entirety.

TECHNICAL FIELD

The present disclosure generally relates to digital subscriber line systems and specifically to the use of an integrated adaptive hybrid circuit to improve receive signal quality by suppressing transmitter echo and noise.

BACKGROUND

In digital subscriber line (DSL) systems, the same cable is typically used for both transmitting and receiving signals within the network. As such, the receiver not only receives signals from the far end of the cable (such signals are typically attenuated significantly by losses in the cable), but also transmits signals, which are not attenuated by cable losses. For typical DSL systems, signals are received with spectral contents at levels that can be less than −140 dBm/Hz, while signals may be transmitted at levels as high as −40 dBm/Hz. This implies that the DSL system should support a dynamic range in excess of 100 dB, which is particularly challenging in discrete multi tone (DMT) systems as the peak-to-average power ratio (PAR) is approximately 15 dB. This effectively adds another 12 dB on top of the linearity requirement. This increases the dynamic range in excess of 112 dB when measured with a sinusoidal input signal having a PAR of 3 dB.

Linearity and noise requirements of the receiver are generally not driven by the system's ability to receive the signal from the far end as this signal is small and has been significantly attenuated. Rather, the requirements are driven by the noise and echo signal coupling in from the transmitted signal as this signal is much larger as it has not been attenuated by the cable. Most DSL systems rely on FDM (frequency division multiplexing), where the transmitted and received signals are at different frequencies, and where band-pass filtering is used to reduce echo and out of band noise. However, some systems such as symmetric DSL (SHDSL) systems and full overlap echo-cancelled asymmetric DSL (ADSL) systems share receive and transmit frequencies, thereby making filtering impossible. Furthermore, filtering can be expensive from the standpoint of additional bill of material (BOM) if the filtering is implemented with external filters. If the filtering is implemented on-chip with integrated filters, the cost can be expensive from the standpoint of power and silicon area required.

SUMMARY

Briefly described, one embodiment, among others, includes an adaptive hybrid system coupled to a loop for adjusting trans-hybrid loss. The system comprises a fixed portion comprising a first receiver transfer function block and a first hybrid transfer function block, wherein the fixed portion is configured to receive a far-end signal and mitigate frequency dependent attenuation experienced by the far-end signal. The system further comprises a variable portion comprising a second receiver transfer function block and a second hybrid transfer function block configured to subtract a transmit echo from the received far-end signal.

Another embodiment is a method performed in an adaptive hybrid circuit for adjusting trans-hybrid loss on a loop. The method comprises determining a reference value of an echo signal, adjusting a transfer function of a receive filter to pass low frequency components in the echo signal, and selecting and activating a resistor array connected in parallel to an output of the adaptive hybrid circuit. The method further comprises adjusting a transfer function of a receive filter to pass high frequency components in the echo signal and selecting and activating a capacitor array connected in parallel to an output of the adaptive hybrid circuit.

Another embodiment is a method for tuning an adaptive hybrid circuit to adjust trans-hybrid loss on a loop. During initialization, two-dimensional tuning is performed on components in the adaptive hybrid circuit. The two-dimensional tuning comprises selecting a resistor array among two resistor arrays that minimizes a echo signal by adjusting either a gain of a receive path or of a hybrid path and selecting a capacitor array among two capacitor arrays that minimizes a echo signal by adjusting either a gain slope and phase of a receive path or of a hybrid path. The method further comprises applying the tuned components in the adaptive hybrid circuit during normal operation.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As described earlier, linearity and noise requirements of the receiver are not driven by the system's ability to receive the signal from the far end as this signal is small and has been significantly attenuated. Rather, the requirements are driven by the noise and echo signal coupling in from the transmitted signal as this signal is much larger since it has not been attenuated by the cable. In order to reduce the energy of the transmit signal that feeds into the receive side, hybrid circuits are commonly utilized to subtract the transmitted signal from the combined transmitted and received signal observed on the cable. The amount of rejection related to the transmitted signal achieved in hybrid circuits is measured as trans-hybrid loss. As the echo typically dictates the linearity requirements and gain in the receive path, any increase in trans-hybrid loss reduces the out-of-band transmit noise requirements and analog-to-digital converter (ADC) requirements. For example, 20 dB of trans-hybrid loss means that any noise and signal from the transmit side will be attenuated by 20 dB before it is fed into the receiver.

Unless the gain is limited by receive signal energy (which is normally not the case), 20 dB of gain can be added before the ADC if a 20 dB trans-hybrid loss is achieved, thereby reducing the ADC requirement by 20 dB. Accordingly, it is important to design a system which can reliably achieve high trans-hybrid loss as this allows the remainder of the system to be significantly simplified. With relatively high trans-hybrid loss, the critical block in the receiver is the first gain stage in the receive chain. In this regard, as a result of poor high trans-hybrid loss, noise in the transmit path will degrade receiver performance, and significant noise will be added by the ADC as minimal gain can be added in front. This ultimately leads to a much more complicated analog front-end (AFE) design, thereby increasing power consumption.

Figure 1:
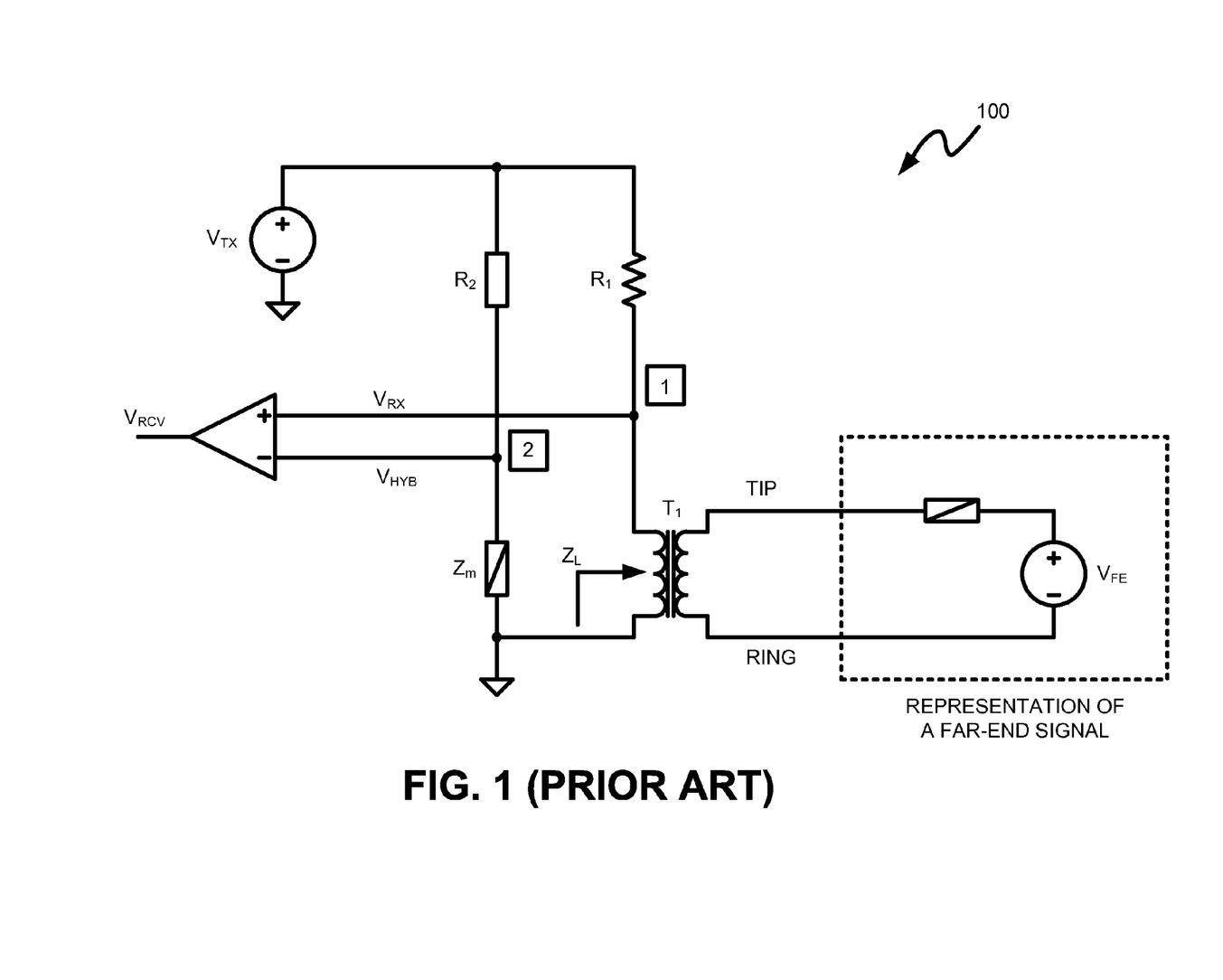
FIG. 1 shows a schematic of a prior art hybrid circuit.

To achieve high trans-hybrid loss, impedance matching is performed. Generally, this is achieved by examining a signal from the loop that contains the combined transmit and receive signal. Next, a representation of the transmitted signal is generated. The representation of the transmitted signal is then subtracted from the combined signal such that only the receive signal remains. Reference is made to FIG. 1, which depicts a schematic of a prior art hybrid circuit 100. The fixed hybrid circuit 100 shown exhibits a first-order degree of cancellation of the transmitted signal echo and transmitter noise. An estimate of the echo signal is derived using a voltage divider comprising $R_2$ and $Z_m$. The resulting signal is denoted as $V_{HYB}$. This signal is subtracted from the original receive signal $V_{RX}$. By properly selecting resistor value $R_2$ and impedance $Z_m$, perfect cancellation of the transmitter echo and noise can be achieved. The balance condition is $Z_m/(R_2+Z_m)=Z_L/(R_1+Z_L)$.

To obtain at least 40 dB of trans-hybrid loss, the assumed line impedance and actual line impedance should ideally be within a two percent match of each other. This, however, makes it impractical to use a single external hybrid if a single platform is to support multiple loop types, including but not limited to, twisted pair type TP-100, TP-150, and 0.4 mm cables as the characteristic impedance associated with these loop types varies between approximately 90 Ohms and approximately 150 Ohms. This is significant as it is difficult to match this range of impedances with a single network. For higher frequencies (e.g., 30 MHz) encountered for 6-band very-high-bitrate DSL (VDSL) systems, random variations in transformer and board parasitic effects also makes it very difficult to maintain this level of impedance matching as a difference of just a few picofards (pF) significantly reduces the trans-hybrid loss at these high frequencies. In this regard, it is extremely difficult to design cost and power efficient CODECs that perform well over a variety of different line conditions and frequencies. Thus, conventional platforms are typically optimized for a specific band plan and line condition.

There are other more expensive, less adaptive solutions currently used in the DSL market place. One approach is to rely on a single external hybrid without any means of adaptation. With this approach, the same external hybrid is used for different loop types (e.g., TP-100 and TP-150). However, this approach yields only about 20 dB of trans-hybrid loss. The nominal impedance for a TP-100 loop is approximately 100 Ohms, and the nominal impedance for TP-150 is approximately 150 Ohms. As both impedances cannot be matched with a single external impedance, a 125 Ohm external hybrid is typically implemented to achieve 20 dB of trans-hybrid loss. However, such low trans-hybrid loss puts a very heavy burden on the rest of the signal path as only 20 dB of rejection exists for the transmit signal, thereby resulting in such side effects as large echo, a large degree of transmit noise bleeding into the receive signal, and minimal gain before the ADC. The minimal gain results in a significant contribution of the ADC noise.

Yet another conventional approach involves utilizing population options with different external hybrids for different loop types (e.g., TP-100, TP-150, 0.4 mm loops). One perceived shortcoming with this approach, however, is that it forces the service provider to use different platforms for different loops, thereby complicating the qualification, deployment, and maintenance processes. Another approach is use several passive, external hybrids and select the one that provides the highest trans-hybrid loss for a given loop condition. This approach, however, is not practical for central office (CO) platforms which tend to be density-driven such that external components, signal routing, and device pin count are critical to design considerations.

Various embodiments are directed to integrated adaptive hybrids configured to adapt to various line impedances and compensate for random capacitive, parasitic effects that become critical for higher frequency operations required in VDSL systems. Embodiments of a single passive external hybrid system are described that incorporate one characteristic line impedance (e.g., TP-100). For such embodiments, the transmit echo is subtracted from the combined transmit/receive signal by providing a programmable relative gain between the hybrid path and the receive path.

Figure 2:
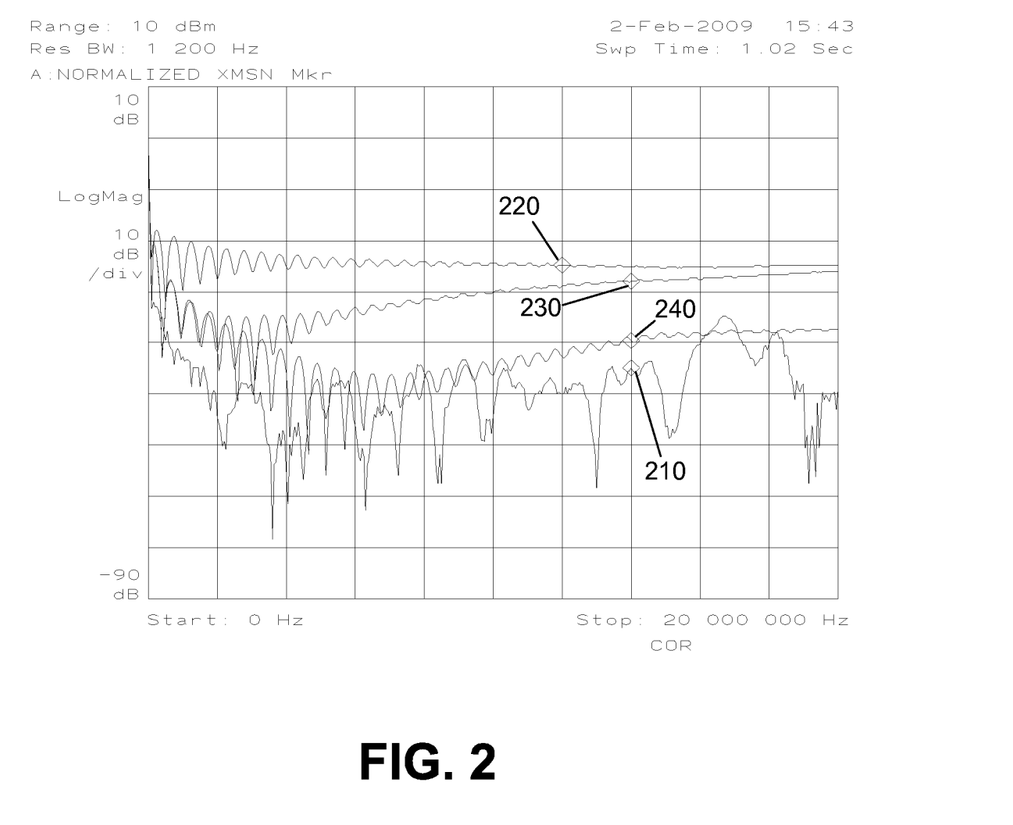
FIG. 2 shows the measured trans-hybrid loss for a passive hybrid designed for a TP-100 loop.

Reference is made to FIG. 2, which shows the measured trans-hybrid loss for a conventional passive hybrid optimized for a TP-100 loop. As shown by the first curve 210, the trans-hybrid loss is excellent, averaging about 45 dB for all frequencies between 500 kHz and 20 MHz. The scale on this measured data is −10 dB to +90 dB trans-hybrid loss in 10 dB increments. However, when connecting the same external hybrid (which is optimized to match a TP-100 cable) to a TP-150 cable or line simulator, the measured trans-hybrid loss drops sharply by approximately 25 dB, as illustrated by the second curve in 220 in FIG. 2. This is a 20+dB reduction in trans-hybrid loss, which means that the system is now ten times more sensitive to noise coupling in from the transmitted signal. Furthermore, the system will have ten times less gain before the ADC stage, which effectively makes the ADC noise ten times more significant.

Various embodiments incorporate a two-step optimization to compensate for such mismatches in the impedance. First, the relative gain tuning is performed to optimize for low frequency rejection. At low frequencies, the trans-hybrid loss can be improved by approximately 12 dB (as represented by trace 230), which reduces the receive signal degradation imposed by the echo signal by a factor of four. However, at the high frequencies typically utilized for short loop VDSL2 systems, more than simple gain scaling is needed in order to achieve a good impedance match. Therefore, the second step comprises adjusting the capacitive impedance separately. Through this step, an additional 12 dB of trans-hybrid loss can be achieved (trace 240) even for frequencies up to 20 MHz. Significantly, through this approach, similar performance can be achieved with a single external hybrid for both TP-100 and TP-150 loops with a four-times reduction in the requirements for the transmit path and the ADC in the CODEC as compared to a comparable solution using a single comparable external passive hybrid.

Based on the approach described above for adaptive gain and capacitive input, exemplary embodiments of an adaptive hybrid system may also be fine tuned to address random mismatches and capacitive parasitics. Such random mismatches and parasitic effects can be attributed to various factors. For example, the external routing is typically different between different channels. Furthermore, the actual leakage inductance can vary between various transformers on a given board. By utilizing adaptive capacitive tuning in accordance with various embodiments, calibration can be performed to mitigate capacitive mismatches by adaptively adding capacitance as needed.

Figure 3:
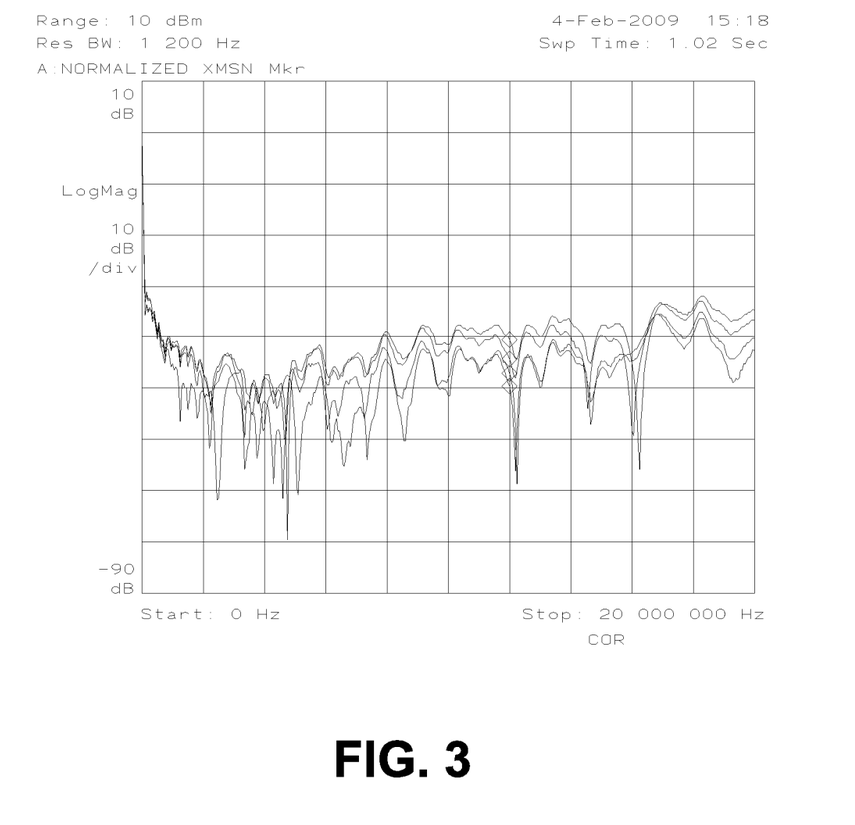
FIG. 3 illustrates the difference in trans-hybrid loss across four different ports with schematically the same identical passive hybrid.

To illustrate the variations in trans-hybrid loss, reference is made to FIG. 3, which shows the trans-hybrid loss measured for four different ports using schematically the same identical passive hybrid. As shown, there is almost a 10 dB difference in actual measured trans-hybrid loss across the four ports at 12 MHz. The actual trans-hybrid loss measured varies between 40 dB and 50 dB for the four ports. The differences in trans-hybrid loss between the ports can be attributed to various factors, including but not limited to board routing, differences in actual values for the discrete components used to implement the external hybrid, and differences in leakage inductance between the four transformers.

Figure 4:
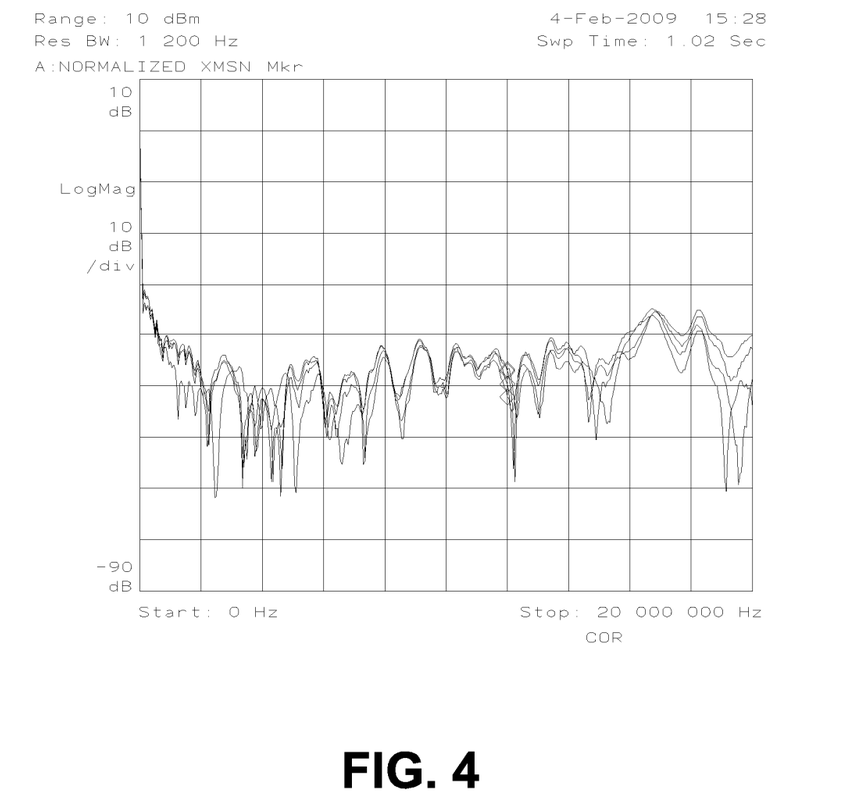
FIG. 4 illustrates the increase in trans-hybrid loss after implementing capacitive tuning.

As one skilled in the art will appreciate, hybrid matching becomes particularly challenging at high frequencies as the system becomes susceptible to parasitic effects and capacitive differences at those frequencies. To address perceived shortcomings with conventional hybrid circuits, various embodiments incorporate an adaptive capacitive scheme using internal adaptation to compensate for differences introduced by parasitic effects and differences in the external hybrid to achieve a high degree of impedance matching. Reference is made to FIG. 4, which shows results obtained prior to using capacitive tuning where the worst trans-hybrid loss measurement increased from 40 dB back to 45 dB. While the initial offset and the required correction are generally small, it should be emphasized that the advantages of capacitive tuning will become much more significant across a larger population of ports in minimizing port-to-port performance differences.

Exemplary embodiments of a hybrid system significantly improve trans-hybrid loss by using a single, common external hybrid and adaptively calibrating the integrated hybrid function for different loops. For example, with the adaptive hybrid system described herein, 45 dB of trans-hybrid loss can be achieved for a TP-100 loop, while for a TP-150 loop, the same adaptive hybrid system may be utilized to achieve approximately 40 dB of trans-hybrid loss. Various embodiments comprise an adaptive relative gain module, which is used during subtraction of the transmit signal from the combined receive/transmit signal. The adaptive relative gain module is also used to provide an adaptive capacitive load to the hybrid input with minimal cost from the standpoint of silicon and power consumption. Note that improving the trans-hybrid loss by 12 dB eases the requirements on the transmit path and ADC by a factor of four by reducing the echo level. Accordingly, the hybrid system described may be utilized across different loops without a significant sacrifice in system performance. Other conventional, non-adaptive solutions require more stringent performance requirements on the CODEC, thereby increasing cost and/or power. Another perceived shortcoming with conventional hybrids is that different external hybrids are needed for the different loops in order to achieve similar trans-hybrid loss. This results in an increase in the bill of materials (BOM) and ultimately, cost of the overall system.

An adaptive hybrid system and tuning method are now described, which incorporate a calibration process to mitigate capacitive mismatches/parasitic effects in an external hybrid, thereby reducing the port-to-port variation in trans-hybrid loss. This is particularly critical for high bandwidth VDSL applications. Some embodiments of the adaptive hybrid system are designed such that on-chip resistor-capacitor (RC) circuits are only connected when the loop deviates from the normal loop impedance. This ensures that the RC circuits do not add any distortion or noise relative to a conventional hybrid circuit and therefore results in high linearity and low noise. When the loop impedance deviates from the normal impedance, the adaptive hybrid system is configured to connect and tune the RC circuits. In accordance with some embodiments, the tuning process may be controlled by firmware. While noise and distortion are slightly increased, the gain in performance due to improved trans-hybrid loss significantly outweighs the loss due to the increase of noise and distortion due to the added RC circuits.

Figure 5:
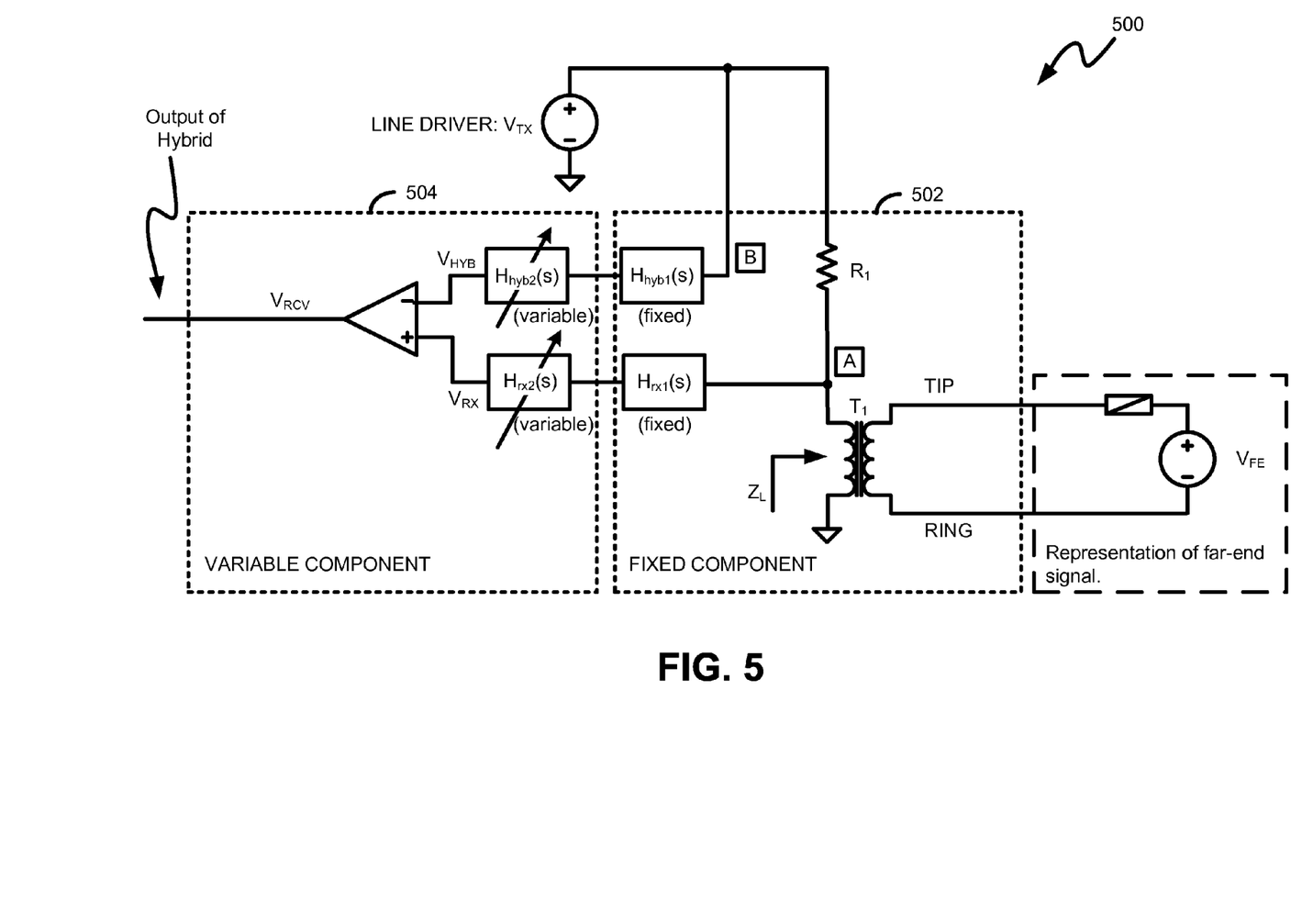
FIG. 5 depicts an embodiment of an adaptive hybrid circuit, where the hybrid and receive networks are separated into a fixed and a variable portion.

Reference is now made to FIG. 5, which depicts an embodiment of an adaptive hybrid system 500, where the system 500 comprises a fixed component 502 and a variable component 504. The fixed component 502 comprises a first receive transfer function block $H_{rx1}(s)$ and a first hybrid transfer function block $H_{hyb1}(s)$. Both transfer function blocks are used to configure the overall transfer function of the external component 502. Similarly, the variable component 504 comprises a second receive transfer function block $H_{rx2}(s)$ and a second hybrid transfer function block $H_{hyb2}(s)$, both of which control the transfer function of components integrated into the analog front end device. The signal $V_{RX}$ denotes the receive signal prior to echo cancellation. The signal $V_{HYB}$ is the estimated echo signal that must be subtracted from the receive signal to cancel the echo. Signal $V_{RCV}$ represents the receive signal after echo cancellation, $V_{RCV} = V_{RX} - V_{HYB}$. Perfect echo cancellation results when $H_{hyb1}(s)H_{hyb2}(s) = H_{rx1}(s)H_{rx2}(s)Z_L/(R_1+Z_L)$.

Based on the transfer function blocks $H_{rx1}(s)$ and $H_{rx2}(s)$, the adaptive hybrid system 500 performs spectral shaping of the far-end receive signal or echo. Note that such spectral shaping is separate from the hybrid function. The overall receive transfer function can be configured to be a high-pass function, a low-pass function, or a band-pass function, which allows the adaptive hybrid system 500 to attenuate unwanted signal components. Note that the adaptive hybrid system 500 may be configured to emphasize specific signal components, e.g., high frequency components that are considerably more attenuated by the loop than lower frequencies. When spectral shaping is not needed, transfer function $H_{rx1}(s)$ can be set to 1. For the nominal loop impedance, $Z_{L0}$, the transfer functions can be set such that $H_{rx2}(s)=H_{hyb2}(s)=1$. Note that the hybrid is balanced when $H_{hyb1}(s)=Z_{L0}/(R_1+Z_{L0})$.

By configuring the transfer function blocks $H_{hyb2}(s)$ and $H_{rx2}(s)$ to 1 for the nominal impedance, the adaptive hybrid system 500 ensures that no noise, distortion, or attenuation is added for loops that perform well with a standard fixed hybrid. The added transfer function blocks $H_{hyb2}(s)$ and $H_{rx2}(s)$ are only activated for loops with a deviating impedance (when system performance is significantly impacted with a fixed hybrid). When the loop impedance deviates from the nominal impedance $Z_{L0}$, the adaptive hybrid system 500 activates either blocks $H_{hyb2}(s)$ or $H_{rx2}(s)$, and the corresponding transfer function is adjusted to restore hybrid balance. While it would be sufficient to provide only $H_{hyb2}(s)$ for this purpose and leave $H_{rx2}(s)$ out, the inclusion of transfer function block $H_{rx2}(s)$ can result in simpler implementation overall.

Figure 6:
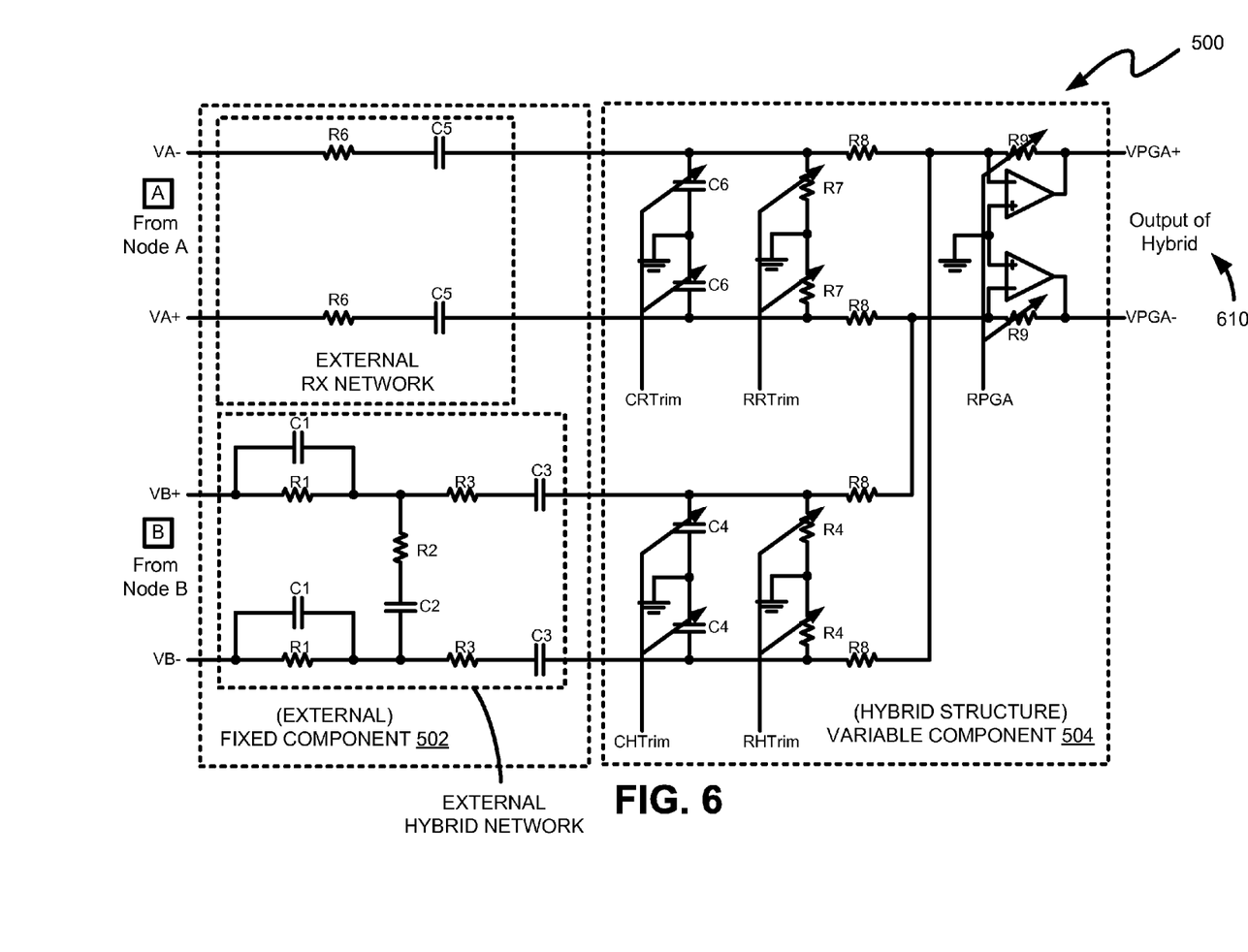
FIG. 6 depicts an embodiment of an adaptive hybrid circuit, where the fixed part comprises external RC networks and the variable part comprises programmable resistor and capacitor arrays.

FIG. 6 represents one possible implementation of the adaptive hybrid system 500 in FIG. 5. The transfer function blocks ($H_{rx1}(s)$ and $H_{hyb1}(s)$) in the fixed component of the adaptive hybrid system 500 comprise two external resistor-capacitor (RC) networks for configuring transfer functions $H_{rx1}(s)$ and $H_{hyb1}(s)$. The transfer functions blocks $H_{rx2}(s)$ and $H_{hyb2}(s)$ in the variable component are implemented in an analog front end. The analog front end further comprises capacitor arrays (C4, C6), resistor arrays (R4, R7), and resistor R8. For this implementation, the capacitor and resistor arrays are programmable and can be disconnected from the signal path when not in use. Furthermore, for some implementations, the capacitance and/or resistance values can be set by writing into registers through firmware.

Note that for the implementation shown in FIG. 6, the adaptive hybrid system 500 does not include buffer amplifiers between the external and internal portions of the hybrid system 500. In the hybrid system 500, it is implicitly assumed that the internal and external transfer functions are independent of each other. For example, the transfer function $H_{hyb2}(s)$ is assumed to be independent of $H_{hyb1}(s)$. Therefore, $H_{hyb1}(s)$ does not change when $H_{hyb2}(s)$ is adjusted to balance the hybrid system 500 and vice versa. Independence between blocks may be achieved by placing a buffer amplifier between blocks. In practice, it is not necessary for the two transfer functions to be completely independent as long as $H_{hyb1}(s)$ does not change substantially when $H_{hyb2}(s)$ is adjusted. This is generally true when the loading presented by $H_{hyb2}(s)$ on $H_{hyb1}(s)$ is relatively small and applies to the implementation shown in FIG. 6, since generally, the values of the resistor arrays R4 and R7 are much larger than R8 as well as R1, R2, R3, and R6. Conversely, the values of the capacitor arrays C4 and C6 are much smaller than C2, C3, and C5. Note that by avoiding buffers in the implementation shown, noise and distortion can be avoided. Furthermore, the device area and power consumption requirements are reduced.

In accordance with various embodiments, the adaptive hybrid system 500 is calibrated based on the assumption that the adaptive hybrid system 500 is connected to a loop with nominal impedance ($Z_{L0}$). During initialization, the capacitor arrays C4 and C5 and resistor arrays R4 and R7 are disconnected from the signal path (i.e., C4=C6=0, R4=R7=∞). The receive transfer function $H_{rx1}(s)$ has a high-pass characteristic determined by the values of capacitor C6 and resistors R6, R8, and R9. Components R1, R2, R3, C1, C2, and C3 create transfer function $H_{Hyb1}(s)$ that balances the hybrid. While it is possible to derive the component values in closed form for special cases of $Z_{L0}$, a numerical optimization process is generally utilized to maximize the trans-hybrid loss over a frequency range of interest.

If the loop impedance of the adaptive hybrid system 500 is different from $Z_{L0}$, resistor arrays R4 and R7 and capacitor arrays C4 and C6 are connected, and their values are tuned to balance the hybrid. Note that the values of R4 and R7 affect the gain across all frequencies, while C4 and C6 selectively affect the gain and phase at high frequencies. When the actual loop impedance of adaptive hybrid system 500 is lower than the nominal loop impedance $Z_{L0}$, the signal at node A as shown in FIGS. 5, 6 is decreased, while the signal at node B is unchanged. In such cases, the hybrid 500 is unbalanced. Balance is restored by reducing the gain from node B to the hybrid output 610. This is accomplished by connecting resistor array R4 to the signal path and selecting an optimum resistor value. More details on how optimum resistor values are derived are described later.

Conversely, when the actual loop impedance of the adaptive hybrid system 500 is higher than the nominal loop impedance $Z_{L0}$, the signal at node A is increased, while the signal at node B is unchanged. Again, in such cases, the hybrid is unbalanced. Balance is restored by reducing the gain from node A to the hybrid output. This is accomplished by connecting resistor array R7 to the signal path and selecting an optimum resistor value. Capacitor arrays C4 and C6 are similarly used, but their capacitance only affects gain and phase at high frequencies. For example, suppose that excess capacitance is present at the line interface in parallel to the loop. The capacitance may be the input capacitance of a service splitter which combines the xDSL signal with a conventional telephony signal towards the subscriber line. Because of the excess capacitance, the signal at node A (in FIGS. 5, 6) rolls off towards high frequencies relative to the nominal case, while the signal at node B remains unchanged. Therefore, the hybrid is unbalanced. Balance is restored to a first order of approximation by creating an equivalent roll-off in the signal path between node B and the hybrid output. This is accomplished by connecting capacitor array C4 to the signal path and selecting the correct capacitance.

In other instances, excess inductance may be present at the line interface in series with the loop. The inductance may be caused for example, by a line transformer with high leakage inductance. Because of the excess inductance, the signal at node A increases towards high frequencies relative to the nominal case, while the signal at node B remains unchanged. In this case, the hybrid is unbalanced. Balance is restored to a first order of approximation by connecting the capacitor array C6 to the signal path between node A and the hybrid output and selecting an optimum capacitance value.

In the cases described above, the amount of capacitance added is quite small (generally less than a few tens of picofarads) and therefore, for some embodiments of the adaptive hybrid system 500, variable capacitance (via capacitor arrays) is implemented inside the analog front end device. As previously noted for the embodiment shown in FIG. 6, in some cases the external and internal transfer functions may not be entirely independent. For example, the cutoff frequency and gain of the high-pass receive transfer function $H_{rx1}(s)$ changes slightly when the capacitor array C6 or the resistor array R7 is connected to the signal path. However, since the resistor value of R7 is generally relatively large (on the order of several kilo-ohms) and the capacitance of C6 is relatively small (on the order of a few picofarads) compared to C5, R6 and R8, the impact is relatively small.

Figure 7:
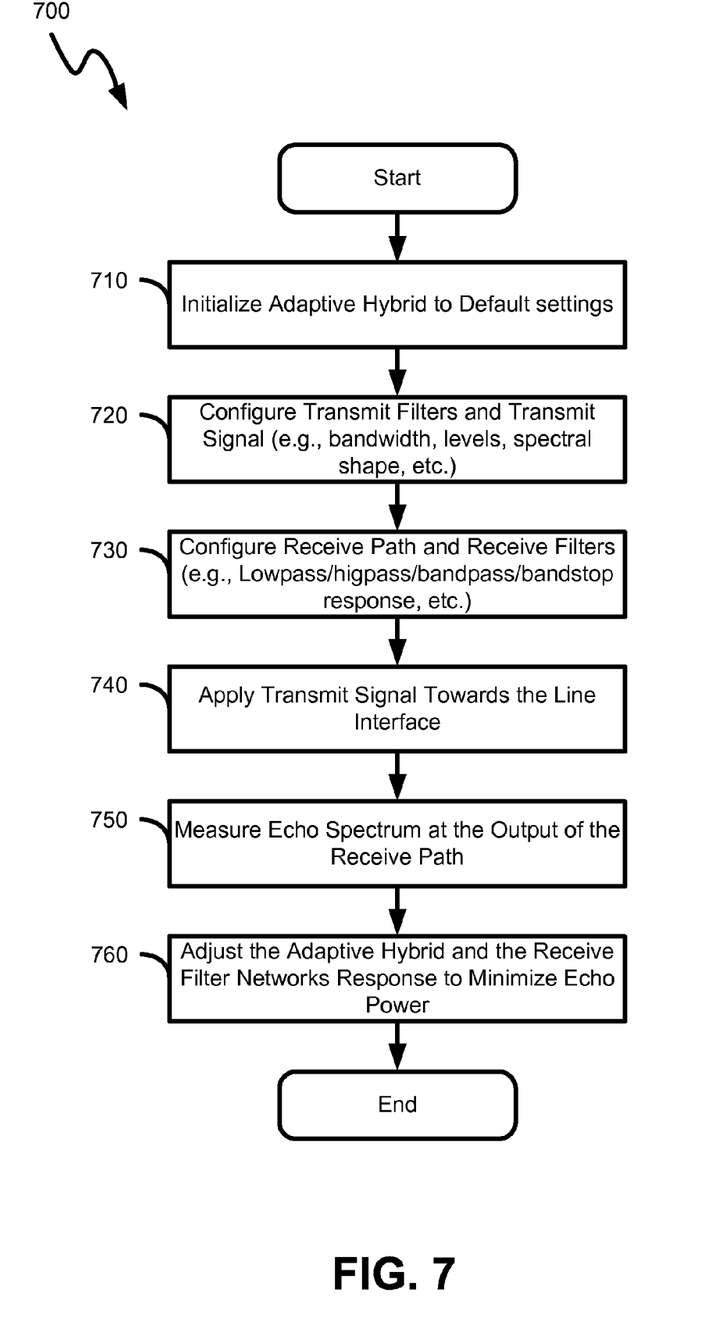
FIGS. 7-8 are flowcharts for adjusting or tuning the adaptive hybrid systems shown in FIGS. 5 and 6.

Having described the basic framework for an adaptive hybrid system 500, a selection process for deriving optimum resistor and capacitor values of the resistor and capacitor arrays in FIG. 6 is now described. In accordance with various embodiments, optimum resistor or capacitor values for the component arrays shown are determined iteratively through an optimization process, which may be implemented in firmware. Reference is made to FIG. 7, which is a flow chart 700 of an optimization process for automatically tuning the adaptive hybrid system 500. Beginning with block 710, the adaptive hybrid system 500 is initialized to default settings. In block 720, the transmitter signal and transmit filters are configured to generate an optimum hybrid response. These settings will be identical or similar to those used during normal operation of the transceiver, but it is possible to emphasize certain frequency bands. The settings are adjusted to generate a particular response, which may comprise, for example, a particular bandwidth response, output level, spectral shape, and so on. The settings are also selected so that the normal xDSL handshaking and startup processes of the overall system are not affected.

Similarly, in block 730, the receive filters and gain are also configured. As described earlier, the overall receive transfer function can be configured to be a high-pass function, a low-pass function, or a band-pass function, which allows the adaptive hybrid system 500 to attenuate unwanted signal components. In block 740, the transmit signal is applied and the echo spectrum is measured at the output of the receive path (block 750). In block 760, the parameters of the adaptive hybrid are iteratively adjusted such that the echo power is minimized and/or to achieve a specific desired response. These optimum parameter values are stored for use during the normal startup process. The complexity of the optimization algorithm varies depending on the number of parameters.

Figure 8:
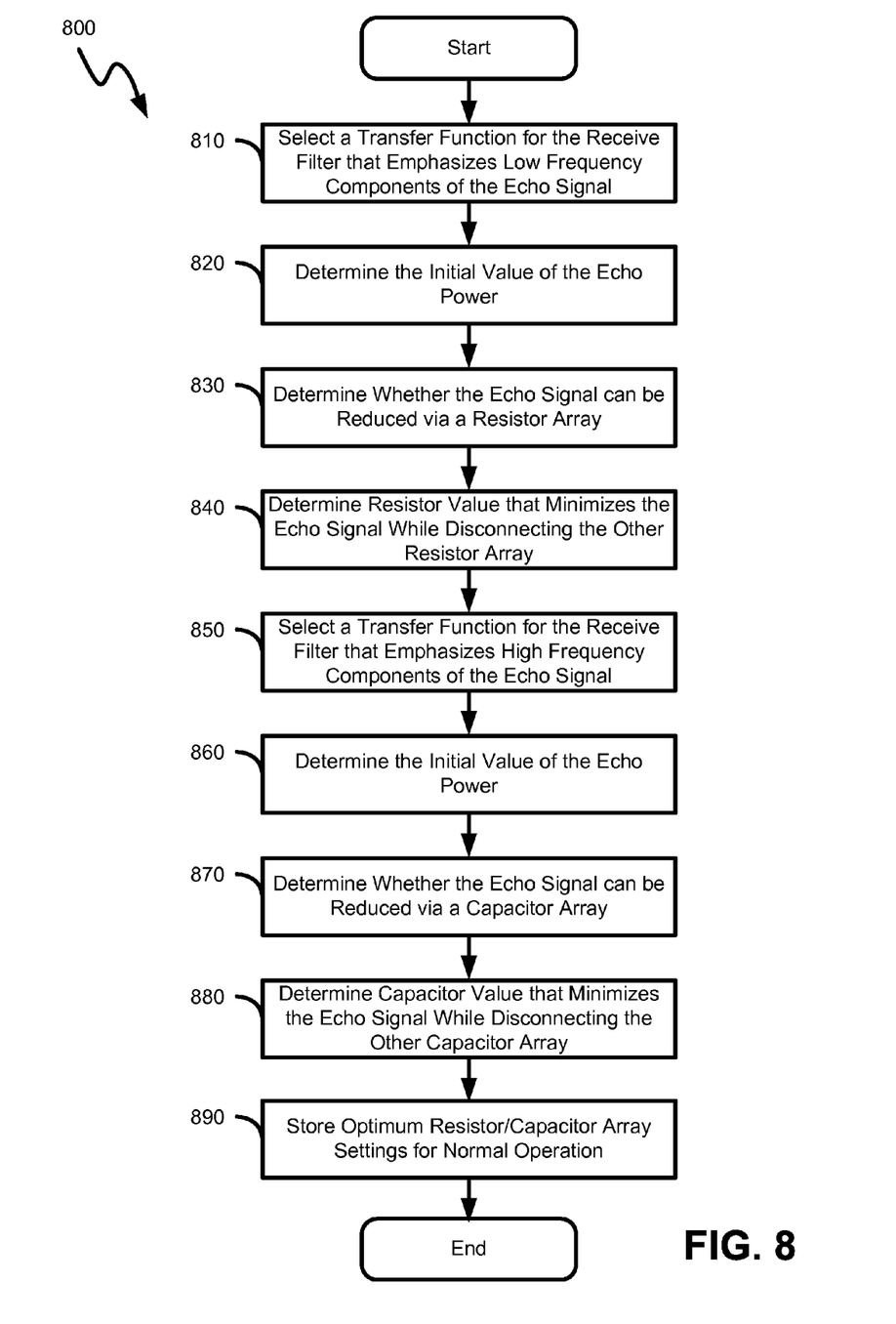

For the implementation depicted in FIG. 6, four parameters may be incorporated. Note, however, that for some embodiments, the complexity of the optimization process can be further reduced by only adjusting just two parameters at a time. In particular, only one resistor array and one capacitor array will be active at any given time, while the other arrays remain disconnected. With this configuration, the following two dimensional tuning process is performed. With reference to FIG. 8, in block 810, the low frequency trans-hybrid loss is optimized by selecting a transfer function for the receive filter that emphasizes low frequency components of the echo signal. In block 820, the initial value of echo power is determined. In block 830, a determination is made on whether the echo can be reduced by connecting resistor array R4 or R7. Resistor arrays and capacitor arrays are initially disconnected. Tuning of the resistor array is performed by switching in the highest possible value of one of the resistor arrays. The value of the array is then decreased step by step until an optimum value is found. Conversely, the capacitor array is tuned by switching in the smallest (non-zero) capacitor value possible. The value of the capacitor array is then increased until an optimum value is found. Once the optimum configuration has been determined (e.g., whether to connect resistor array R4) for maximizing trans-hybrid loss, the resistor value that minimizes echo is determined based on an iterative process (block 840). During this process, the second resistor array (i.e., R7 in the implementation shown earlier) is disconnected.

In block 850, the high frequency components of the echo signal are emphasized by selecting a receive filter that boost high frequency components of the echo signal. In block 860, the initial echo response is determined. In block 870, a determination is made on whether the echo can be reduced by connecting capacitor arrays C4 or C6. Once the correct capacitor array has been determined (e.g., whether to connect capacitor array C6), the capacitor value that minimizes echo is determined based on an iterative process. During this process, the second capacitor array (i.e., C7 in the implementation shown earlier) is disconnected (block 880). In block 890, the optimum settings derived for both the low frequency and high frequency components of the echo signal are then stored for later use during normal operation. The two dimensional tuning process outlined above relies on the fact that the resistor arrays affect overall gain and therefore the low frequency behavior of the adaptive hybrid system 500, while the capacitor arrays mainly affect the gain slope and phase at high frequencies and therefore the high frequency behavior of the hybrid.

It should be emphasized that the processes outlined in the flowcharts above may be in embodied in software, hardware, or a combination of both software and hardware. If embodied in software, each block depicted in FIGS. 7 and 8 represents a module, segment, or portion of code that comprises program instructions to implement the specified logical function(s). In this regard, the program instructions may be embodied in the form of source code that comprises statements written in a programming language or machine code that comprises numerical instructions recognizable by a suitable execution system such as a processor in a communication system or other system such as the one shown in FIG. 9. The machine code may be converted from the source code, etc. If embodied in hardware, each block may represent a circuit or a number of interconnected circuits to implement the specified logical function(s). Furthermore, as one of ordinary skill in the art will appreciate, other sequences of steps may be possible, and the particular order of steps set forth herein should not be construed as limitations on the claims.

The processes described provides a fast and efficient means (for some implementations, on the order of milliseconds) to complete each optimization step and on the order of a few tenths of a second to complete the overall process. The processes described can be expanded to incorporate joint optimization of the values of the resistor and capacitor arrays. The processes can also be configured to analyze the spectral content of the echo signal (e.g., via an FFT module) instead of overall power and use this information to build a complex goal function that drives the optimization process.

Figure 9:
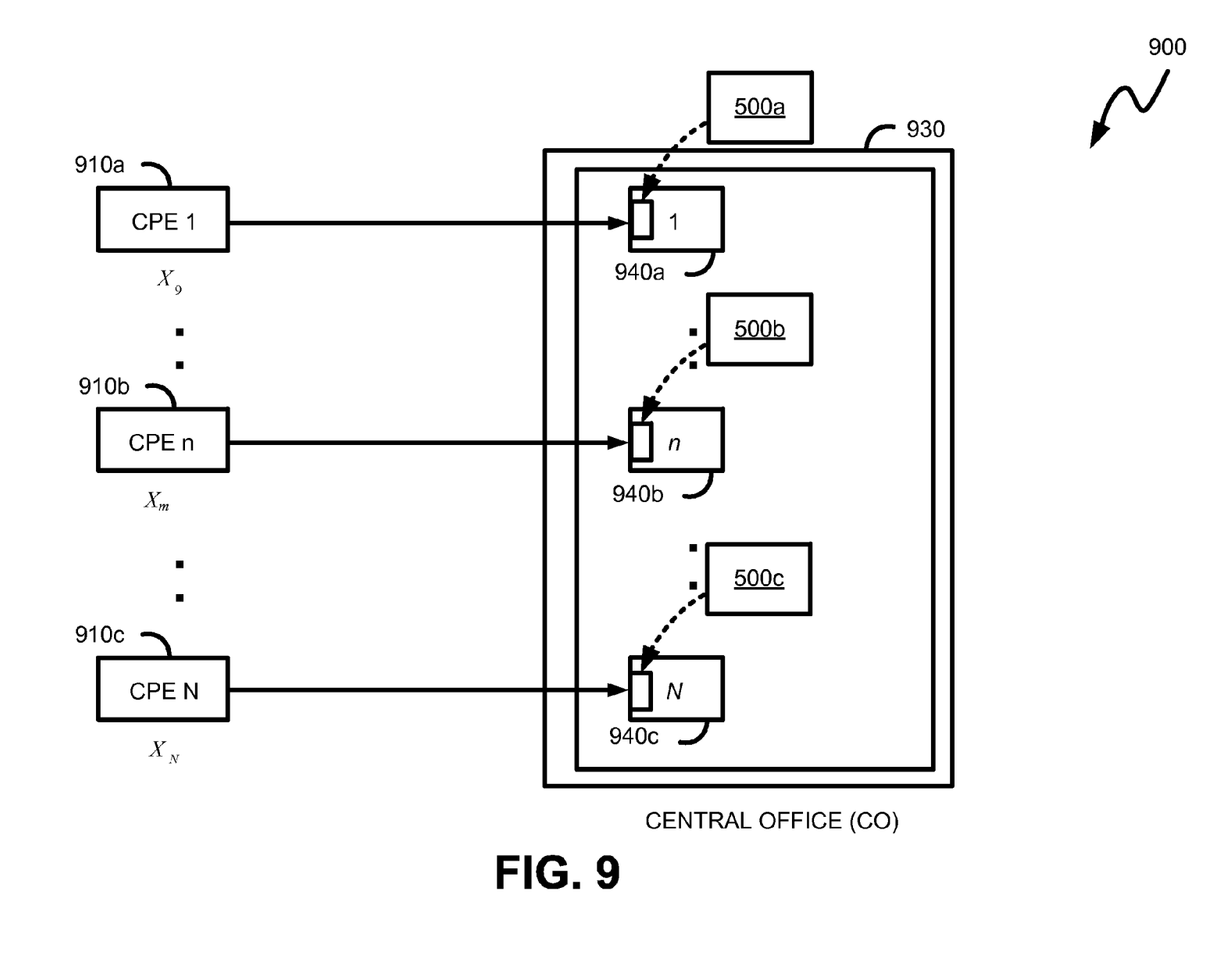
FIG. 9 illustrates a communications network in which embodiments of an adaptive hybrid system may be implemented.

Reference is now made to FIG. 9, which illustrates a communication system 900 in which the described embodiments of an adaptive hybrid system may be implemented. In accordance with some embodiments, the communication system 900 may comprise a DMT-based xDSL system. As depicted in FIG. 9, the communication system 900 includes a central office (CO) 930 and a plurality of CPE (customer premises equipment) devices 910*a*, 910*b*, 910*c*, where each device 910*a*, 910*b*, 910*c* is referenced by index n. The CO 130 includes an xDSL access multiplexer (DSLAM), xDSL line cards 140*a*, 140*b*, 140*c*, and other equipment for interfacing with users 910*a*, 910*b*, 910*c*. In some embodiments, the adaptive hybrid system 500 described herein may be implemented on the 2-wire interface of each of the xDSL line cards 940*a*, 940b, 940c. It should be emphasized that while embodiments of the adaptive hybrid system 500 are described in the context of CO-centric implementations, the adaptive hybrid system 500 may also be implemented on the CPE side.

Figure 10:
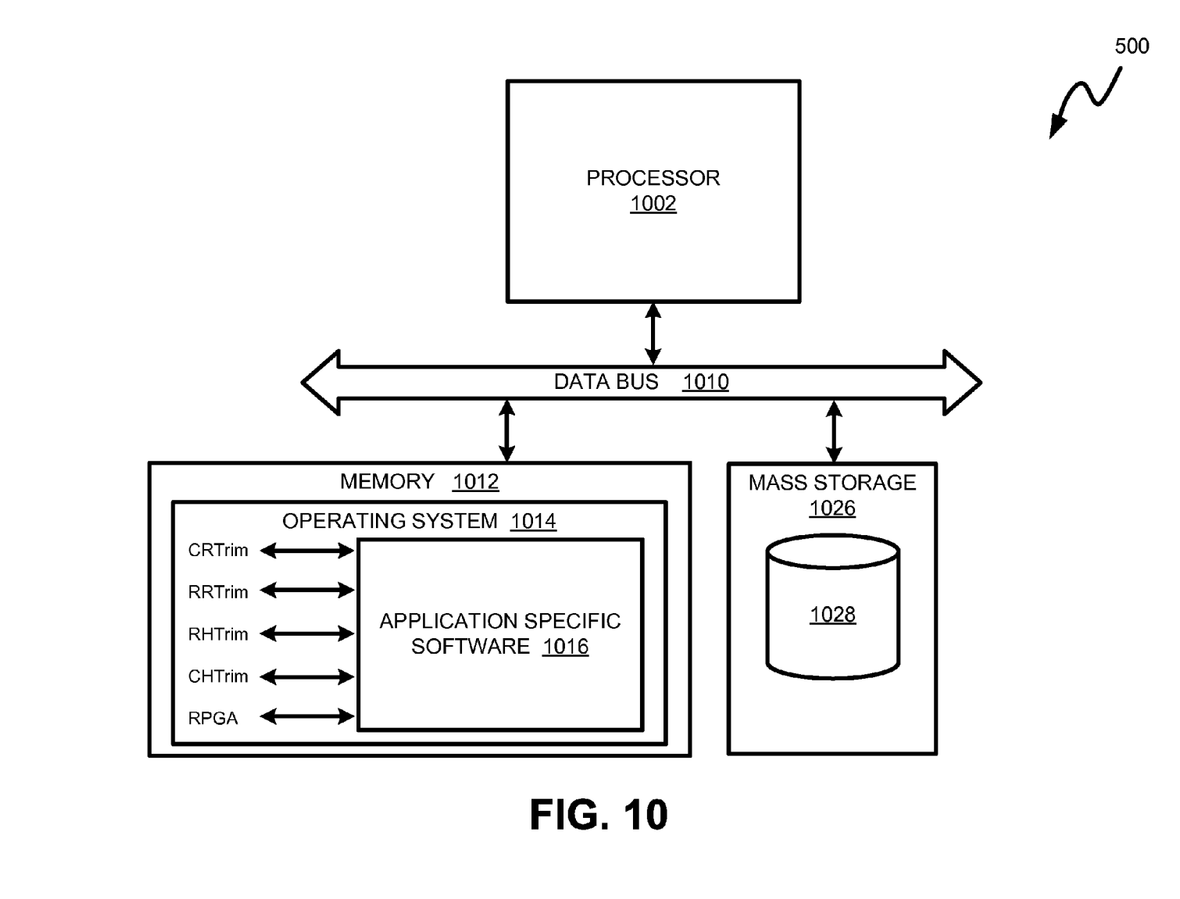
FIG. 10 is a schematic block diagram of other components within an adaptive hybrid system.

FIG. 10 illustrates an embodiment of an adaptive hybrid system 500 located within the CO 930 in FIG. 9 for executing and controlling the various components. As described earlier, for some embodiments, the tuning process described with respect to FIGS. 7 and 8 may be controlled by firmware. Generally speaking, the adaptive hybrid system 500 may comprise any one of a number of computing devices. Irrespective of its specific arrangement, the adaptive hybrid system 500 may comprise memory 1012, a processor 1002, and mass storage 1026, wherein each of these devices are connected across a data bus 1010.

The processor 1002 may include any custom made or commercially available processor, a central processing unit (CPU) or an auxiliary processor among several processors associated with the adaptive hybrid system 500, a semiconductor based microprocessor (in the form of a microchip), one or more application specific integrated circuits (ASICs), a plurality of suitably configured digital logic gates, and other well known electrical configurations comprising discrete elements both individually and in various combinations to coordinate the overall operation of the computing system.

The memory 1012 can include any one or a combination of volatile memory elements (e.g., random-access memory (RAM, such as DRAM, and SRAM, etc.)) and nonvolatile memory elements (e.g., ROM, hard drive, CDROM, etc.). The memory 1012 typically comprises a native operating system 1014, one or more native applications, emulation systems, or emulated applications for any of a variety of operating systems and/or emulated hardware platforms, emulated operating systems, etc. For example, the applications may include application specific software 1016 stored on a computer readable medium for execution by the processor 1002 and may include applications for performing the processes outlined in FIGS. 7 and 8. As discussed earlier, for some embodiments, the tuning process described can be controlled in firmware. With reference to FIG. 10, the adaptive hybrid system 500 may comprise application specific software 1016 configured to control specific registers associated with the adjustable components shown in FIG. 6.

Where any of the components described above comprises software or code, the same can be embodied in any computer-readable medium for use by or in connection with an instruction execution system such as, for example, a processor in a computer system or other system. In the context of the present disclosure, a computer-readable medium can be any tangible medium that can contain, store, or maintain the software or code for use by or in connection with an instruction execution system. For example, a computer-readable medium may store one or more programs for execution by the processing device 1002 described above. The computer readable medium can be, for example, but not limited to, an electronic, magnetic, optical, electromagnetic, infrared, or semiconductor system, apparatus, or device.

More specific examples of the computer-readable medium may include an electrical connection having one or more wires, a portable computer diskette, a random access memory (RAM), a read-only memory (ROM), an erasable programmable read-only memory (EPROM, EEPROM, or Flash memory), and a portable compact disc read-only memory (CDROM). As shown in FIG. 10, the adaptive hybrid system 500 may further comprise mass storage 1026. For some embodiments, the mass storage 1026 may include a database 1028 for storing optimum settings, as described with reference to FIG. 8.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 1184, so as to operate properly in connection with the operating system 1190. When the adaptive hybrid system 500 is in operation, the processor 1002 may be configured to execute software stored within the memory component 1012, communicate data to and from the memory component 1012, and generally control operations of the adaptive hybrid system 500 pursuant to the software. Software in memory, in whole or in part, may be read by the processor 1002, perhaps buffered and then executed.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. An adaptive hybrid system coupled to a loop for adjusting trans-hybrid loss, the system comprising:
a fixed component comprising a first receiver transfer function block and a first hybrid transfer function block, wherein the fixed component is configured to receive a far-end signal and mitigate frequency dependent attenuation experienced by the far-end signal; and
a variable component comprising a second receiver transfer function block and a second hybrid transfer function block configured to remove transmit echo from the received far-end signal.

2. The system of claim 1, wherein the second receiver transfer function block and the second hybrid transfer function block comprise programmable resistors and programmable capacitors.

3. The system of claim 2, wherein resistor values and capacitor values associated with the programmable resistors and programmable capacitors are adjustable via firmware by accessing registers associated with each of the programmable components.

4. The system of claim 2, wherein the programmable resistors and programmable capacitors comprise one or more programmable capacitor arrays, one or more programmable resistor arrays, and a programmable resistor.

5. The system of claim 4, wherein the programmable resistor arrays and the programmable capacitor arrays are coupled in parallel with respect to the output of the adaptive hybrid system.

6. The system of claim 1, wherein the transfer function blocks in the fixed component are only activated if an impedance of the loop deviates from an expected impedance by a predetermined amount, wherein the transfer function blocks in the fixed component are configured to provide a unity gain if the impedance of the loop does not deviate from the expected impedance.

7. The system of claim 1, wherein the variable component is integrated into an analog front end (AFE) circuit.

8. The system of claim 1, wherein the variable component performs two-dimensional adaptive tuning to match an impedance of the adaptive hybrid system to an impedance of the loop.

9. The system of claim 1, wherein the first receive transfer function block in the fixed component and the second receive transfer function block in the variable component are configured to perform spectral shaping of the received far-end signal.

10. The system of claim 9, wherein the spectral shaping of the received far-end signal comprises performing one of: low-pass filtering, high-pass filtering, and band-pass filtering on the received far-end signal.

11. A method performed in an adaptive hybrid circuit for adjusting trans-hybrid loss on a loop, comprising:
   receiving an echo signal;
   adjusting a transfer function of a receive filter to pass low frequency components in the received echo signal;
   selecting and activating a resistor array connected in parallel to an output of the adaptive hybrid circuit;
   adjusting a transfer function of a receive filter to pass high frequency components in the received echo signal; and
   selecting and activating a capacitor array connected in parallel to an output of the adaptive hybrid circuit.

12. The method of claim 11, wherein selecting and activating a resistor array comprises selecting a resistor array among a plurality of resistor arrays that most effectively reduces a level of the echo signal.

13. The method of claim 12, further comprising iteratively adjusting the selected resistor array to further reduce the level of the echo signal.

14. The method of claim 11, wherein selecting and activating a capacitor array comprises selecting a capacitor array among a plurality of capacitor arrays that most effectively reduces a level of the echo signal.

15. The method of claim 14, further comprising iteratively adjusting the selected capacitor array to further reduce the level of the echo signal.

16. A method for tuning an adaptive hybrid circuit to adjust trans-hybrid loss on a loop, comprising:
   during initialization, performing two-dimensional tuning of components in the adaptive hybrid circuit, wherein the two-dimensional tuning comprises:
      selecting a resistor array among two resistor arrays that minimizes a gain of an echo signal; and
      selecting a capacitor array among two capacitor arrays that minimizes a gain slope and a phase of the echo signal; and
   applying the tuned components in the adaptive hybrid circuit during normal operation.

17. The method of claim 16, further comprising disconnecting the non-selected resistor array and capacitor array.

18. The method of claim 17, further comprising iteratively adjusting the selected resistor array to further reduce the gain of one of a receive path and a hybrid path within the adaptive hybrid circuit.

19. The method of claim 17, further comprising iteratively adjusting the selected capacitor array to further reduce the gain slope and phase of one of a receive path and a hybrid path within the adaptive hybrid circuit.

20. The method of claim 17, wherein the selection of a resistor array and the selection of a capacitor array are performed jointly.

* * * * *